United States Patent Office 3,189,546
Patented June 15, 1965

3,189,546
MINERAL OIL COMPOSITIONS AND
ADDITIVES THEREFOR
Henricus G. P. van der Voort, Amsterdam, Netherlands, assignor to Shell Oil Company, New York, N.Y., a corporation of Delaware
No Drawing. Filed Dec. 8, 1960, Ser. No. 74,469
Claims priority, application Netherlands, Feb. 9, 1960, 248,210
8 Claims. (Cl. 252—47)

This invention relates to improved lubricating oil composition and to oil-soluble additives therefor having improved detergent and wear-inhibiting properties.

Combustion engines, such as gasoline engines and diesel engines, are more or less subject to wear of cylinders, pistons and piston rings. In automobile engines, in particular, it is a known phenomenon that considerably increased wear occurs when the cylinder temperature remains relatively low, as is the case when driving short distances. According to the general view this is due to moisture condensing on the cool cylinder walls in the presence of acids, such as sulfuric acid from sulfurous fuel, hydrochloric acids from lead scavengers, and organic acids from incompletely burnt gasoline. The corrosion caused by these acids, also termed cold corrosion, is responsible for much of the piston and cylinder wear in automobiles.

In order to inhibit wear in combustion engines, it has already been proposed to incorporate in the lubricating oil certain additives capable of rendering the said acids harmless by neutralizing them. Examples are oil-soluble neutral or basic organic metal compounds, such as calcium, barium or zinc salts of petroleum sulfonic acids, of alkylated hydroxy benzoic acids, and others. In many cases it has been possible to obtain good results by incorporating such organic metal salts in the lubricating oil. The use of metal salts, however, is attended by drawbacks. One disadvantage, for example, is the fact that the metal salts formed by neutralization of the acids resulting from the combustion are generally insoluble in oil. This may lead to disturbances, particularly as a result of the formation of deposits in the combustion space which may subsequently cause precombustion.

It has now been found that excellent detergent and wear inhibitors for lubricants are provided by reacting (I) polymerized 1,2-alkylene imines with (II) a non-polymerizable oil-soluble polar-containing compound selected from the group consisting of (IIa) epoxy or thioethoxy compounds having an oleophilic group of at least 10 carbon atoms, preferably a $C_{10-30}$ alkyl radical in the molecule or (IIb) a hydroxy aromatic compound containing an oleophilic $C_{10-30}$, preferably $C_{14-18}$ alkyl radical in the molecule.

The polymerized imines are derived from 1,2-alkylene imines having the formula

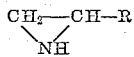

in which R is H or an alkyl radical.

The polymerized 1,2-alkylene imines (I) are preferably polymerization products of ethylene imine and/or propylene imine, although polymerization products derived from higher C-alkyl ethylene imines, such as 1,2-butylene imine, C-propyl ethyl imine, C-tetradecyl ethylene imine and others are also suitable. These polymerized alkylene imines may be prepared in a known manner, e.g., by treating the corresponding monomers with small quantities of acid catalysts such as hydrochloric acid, as described in the German patent specification 665,791 or by condensation of alkylene dichlorides with ammonia as described in U.S. Patent 2,318,730 or by thermal decarboxylation of 2-oxazolidones. The resultant products generally consist of mixtures of polymerization products of varying degrees of polymerization and may contain either branched-chain or straight-chain molecules. Although polymerized 1,2-alkylene imines of any degree of polymerization may be used, products having an average degree of polymerization greater than 5, particularly between 15 and 25, are preferred. The molecular weight of the polyalkylene imines is within the range such that it has an intrinsic viscosity of about 0.025 to about 3 when measured in isopropanol at 25° C. It is necessary for the polyalkylene imines employed to be soluble in oil. Polyalkylene imines are available commercially as 40–70% water solutions and such a product is Badische Anilin und Soda Fabrik's "Polymin P," which is a 50% to 70% water solution of polyethylene imine. A preferable "Polymin P" (A) is one containing about 47% by weight of polyethylene imines, about 53% by weight water and 4.76 milligram atoms of basic nitrogen per gram.

Suitable organic compounds (IIa) or (IIb) which are reacted with polymerized 1,2-alkylene imines to oil-soluble products are as stated (IIa) compounds containing an oleophilic group (alkyl group) having at least 10 carbon atoms and an oxirane ring or its thio counterpart. Examples of such compounds include epoxy alkanes such as epoxy dodecane, epoxy tridecane, epoxy tetradecane, epoxy pentadecane, epoxy hexadecane and the like. Particularly suitable are the epoxy alkanes which may be obtained by epoxidiation of olefins having from 14 to 18 carbon atoms. Other examples of suitable epoxy compounds are: ($IIa_1$) esters of an aliphatic carboxylic acid having 10–30 carbon atoms preferably 12–18 carbon atoms and an epoxy alcohol, particularly esters of an aliphatic carboxylic acid and glycidol, such as glycidyl laurate, glycidyl stearate, thioglycidyl laurate or ($IIa_2$) ethers containing an epoxy ring, such as epoxy aryl ethers in which the aryl group carries an alkyl group with at least 8 carbon atoms, especially glycidyl-alkyl phenyl ethers, such as glycidyl-$C_{14}$-$C_{18}$ alkylphenyl ether. Use may also be made of epoxy or thioepoxy alkyl-alkyl ethers, for instance glycidyl-alkyl ethers such as glycidyl-lauryl ether or glycidyl stearyl ether, thioglycidyl lauryl ether, glycidyl ether of $C_{14-18}$ alkyl phenol.

Suitable organic compounds (IIb) are compounds containing a phenolic hydroxyl group, preferably alkyl phenols, particularly $C_{14}$–$C_{18}$ alkyl phenols, e.g., tetradecyl, hexadecyl, octadecyl phenols, as well as $C_{14}$–$C_{18}$ cracked wax olefin phenols.

According to the invention the polymerization products of 1,2-alkylene imines are converted with the organic compounds (II) by contacting the components, preferably in the liquid phase; in a homogeneous medium. The polymerized 1,2-alkylene imine is generally employed as a solution in an organic solvent, which if desired, may also contain water. Suitable solvents are in particular alcohols having from 1 to 10 carbon atoms, e.g. methanol, ethanol, isopropanol, the butanols, pentanols, and the higher alcohols, for example isooctanol and isononanol and ether alcohols, such as butyl carbitol, and also mixtures of these alcohols with water and/or hydrocarbon, for example gasoline fractions or benzenoid hydrocarbons. The organic compounds (II) are added as such to the solution of the polymerized 1,2-alkylene imines although if desired they may also be used as a solution in an organic solvent. Suitable organic solvents for this purpose are aliphatic alcohols having from 1 to 10 carbon atoms as defined hereinbefore, hydrocarbons, e.g. gasoline fraction and benzenoid hydrocarbons, and mixtures of these organic solvents.

In an advantageous embodiment of the invention an aqueous isopropanol solution of a polymerized 1,2-alkylene imine is contacted with one or more of the suitable organic compounds, after which the solvents are removed by distillation, if desired under reduced pressure. It is also possible to remove the solvents by distillation with steam of 100° C. or superheated steam, for example steam of 130° C., if desired also under reduced pressure. It is preferred to add to the mixture a light petroleum oil, for example a mineral lubricating oil fraction of low viscosity, before the solvents are removed so that after the removal of the solvents a concentrate is obtained which is suitable for addition as such to a lubricating oil. No operations such as centrifuging or filtering are required. All that is required to obtain a product which is clear and entirely soluble in lubricating oil is the removal of the solvents by distillation.

The reaction is generally carried out at temperatures in the range of from 20° C. to 130° C., although higher or lower temperatures are also possible. The reactants are generally reacted in such quantities that an excess of polymerized 1,3-alkylene imine is used per gram-equivalent of the organic compound, viz. more than 1 gram-atom of nitrogen per oxirane ring when use is made of a compound containing an oxirane ring, or per double bond when use is made of a compound containing a double bond activated by an esterified carboxyl group, or per hydroxyl group when a compound containing a phenolic hydroxyl group is employed. The excess may be, for example, 25 to 100%, but the use of an equivalent or smaller quantity of polyalkylene imine is not excluded.

The products obtained according to the invention are suitable as additives to lubricating oils of various types. Such mineral lubricating oils are of diverse viscosity range from SAE 5W viscosity grade to SAE 140 grade and are derived from paraffinic, naphthenic or asphaltic base crudes. Representative oils are refined high viscosity index mineral oils having a viscosity of 100° F. of 100 to 250 SUS. A typical mineral lubricating oil (X) of this type had the following properties:

Gr. °API, 60/60° F. _____ 32
Flash, ° F. _____ 370
Viscosity index (Dean and Davis) _____ 93
Viscosity, SUS at 100° F. _____ 103

The additives of this invention are also suitable incorporated into synthetic lubricating oils as well as into lubricating oils containing fatty oils. The products may also be worked up in lubricating greases. The present products are also suitable for being added to liquid fuels such as gasoline, kerosene, gas oil and residual fuels.

The products may be added as such to the lubricant or in the form of a concentrate thereof obtained by adding a small quantity of a lubricating oil before removing the solvents from the reaction mixture.

The quantity of the products of the invention incorporated into lubricants may vary within wide limits. In general the desired improvement is already obtained when the quantity incorporated varies between 0.05 and 5%, particularly between 0.1 and 1%, based on the finished lubricant. In special cases, however, quantities even greater than the said quantities may be added, for example in the case of diesel engines in which use is made of fuel having a high sulfur content.

In their use the present products may also be combined with other additives, such as anti-oxidants, detergent dopes, viscosity-index improvers, corrosion inhibitors, anti-foaming agents, pour-point depressants, extreme-pressure and oiliness agents and other materials generally added to lubricants.

EXAMPLES

By basic nitrogen in the following examples is meant the base which can be titrated with mineral acid.

EXAMPLE I

The starting material was polymerized ethylene imine "Polymin P" (a commercial product containing about 47% by weight of polyethylene imines, about 53% by weight of water and 4.76 milligram-atoms of basic nitrogen per gram) from which the water had been removed after addition of ethanol and benzene by azeotropic distillation. A quantity of 19.97 parts by weight of the water-free product containing an overall quantity of 199.7 milligram-atoms of basic nitrogen was dissolved in 120 parts by weight of a 1:1 ethanolbenzene mixture. A quantity of 31.2 parts by weight of epoxy dodecane (prepared by epoxidizing dodecene-1) was added to this solution. The mixture contained 0.85 gram-atom of epoxy-oxygen per gram atom of basic nitrogen. The mixture was then boiled under reflux over a steam bath for 20 hours. A quantity of 213.3 parts by weight of an extracted Venezuelan paraffinic lubricating oil having a viscosity of 24 cs. at 100° F., was subsequently added, after which the solvents were removed by distillation with heated steam of 130° C. A quantity of 263.5 parts by weight of concentrate in the said oil was obtained which contained 19% by weight of conversion product and in which per gram 0.85 milliequivalent of basic nitrogen was present.

EXAMPLE II

The starting material was the glycidyl ester prepared from a mixture of $C_{15}$–$C_{19}$ branched aliphatic carboxylic acids obtained from $C_{14}$–$C_{18}$ olefins by adding thereto by means of an addition reaction carbon monoxide and water in the presence of boron trifluoride and phosphoric acid as catalysts. 25.1 parts by weight of this ester (69.1 milligrams-atoms of epoxy-oxygen) were dissolved in 50 parts by weight of isopropanol, after which the resultant solution was added to a mixture of 19.65 parts by weight of aqueous "Polymin P" (commercial product containing approximately 53% by weight of water) and 34.6 parts by weight of isopropanol. The resultant homogeneous mixture containing 0.75 gram-atom of epoxy oxygen per gram atom of basic nitrogen was then boiled for 5 minutes, after which a quantity of 51.7 parts by weight of an extracted Venezuelan paraffinic lubricating oil having a viscosity of 24 cs. at 100° F. was added and the solvents were removed under reduced pressure. The distillation residue (86.2 parts by weight) was a clear concentrate in the said oil, which concentrate contained 39.8% by weight of conversion product. 1.186 milliequivalent of basic nitrogen was present per gram of concentrate.

EXAMPLE III

The sodium salt was prepared from $C_{14}$–$C_{18}$ alkyl phenols obtained by alkylating phenol with a mixture of $C_{14}$–$C_{18}$ olefins. The glycidyl ether of $C_{14}$–$C_{18}$ alkyl phenol was prepared from the sodium salt by means of epichlorohydrin. A quantity of 233.5 parts by weight of "Polymin P" (approximately 53% by weight of water) was diluted with 700 parts by weight of isopropanol. A quantity of 300 parts by weight of the said glycidyl ether was added to this solution of "Polymin P" containing 110 milliequivalents of basic nitrogen. The resultant mixture containing per gram-atom of basic nitrogen 0.625 gram-atom of epoxy-oxygen was boiled with stirring for half an hour. The solvents were then removed by distillation under reduced pressure, a quantity of 861.7 parts by weight of an extracted paraffinic mineral lubricating oil having a viscosity of 24 cs. at 100° F. being simultaneously added. In this way a quantity of 1277 parts by weight of a 32.1% concentrate of the conversion product was obtained, which concentrate contained 0.953 milliequivalent of basic nitrogen per gram.

EXAMPLE IV 377.5 parts by weight of "Polymin P" (water content approximately 53% by weight) were diluted with 700 parts by weight of isopropyl alcohol. A mixture consisting of 343.5 parts by weight of lauryl glycidyl ether (commercial product) with an epoxy-oxygen content of 3.50 milligram-atoms per gram and of 100 parts by weight of isopropanol was then added. The resultant homogeneous solution containing 0.67 gram-atom of epoxy-oxygen per gram-atom of nitrogen was boiled for half an hour. The solvents were distilled off under reduced pressure, a quantity of 1501.5 parts by weight of extracted Venezuelan paraffinic mineral lubricating oil having a viscosity of 24 cs. at 100° F. being simultaneously added. The residue (2020 parts by weight) was a 25.7% concentrate of the conversion product in the said oil and contained 0.99 milliequivalent of basic nitrogen per gram.

EXAMPLE V

The starting material was $C_{14}$-$C_{18}$ alkyl phenol obtained by alkylating phenol with $C_{14}$-$C_{18}$ olefins and distillation of the alkylation product. The alkyl phenol contained per gram 3.11 mg. eq. OH. A quantity of 213 parts of weight of "Polymin P" (1015 mg. eq. of basic nitrogen, about 53% by weight of water) was dissolved with stirring in 1000 parts by weight of isopropanol. A quantity of 238 parts by weight of $C_{14}$-$C_{18}$ alkyl phenol was added to this solution while stirring was continued. After boiling the mixture for half an hour a quantity of 518 parts by weight of the mineral oil described in the previous examples was added. The solvents were then removed by distillation under reduced pressure at a bath temperature of 95° C. A quantity of 862 parts by weight of residue containing 39.2% by weight of conversion product was obtained. The basic nitrogen content was 1.16 mg. eq. per gram.

EXAMPLE VI

The starting materials were technical alkyl phenols obtained by alkylation of phenol with $C_{14}$-$C_{18}$ olefins. In the same manner as described in Example V a quantity of 1406 parts by weight of a 39.5% by weight of concentrate containing 39.5% by weight of conversion product and having a basic nitrogen content of 1.18 mg. eq. per gram was obtained from a quantity of 347 parts by weight of "Polymin P" (1650 mg. eq. of basic nitrogen, approximately 53% by weight of water). A quantity of 390 parts by weight of technical alkyl phenol (2.09 mg. eq. of OH per gram) and 849 parts by weight of the mineral lubricaing oil referred to in the previous examples in 1000 parts by weight of isopropanol as solvent.

In order to demonstrate the utility and improved properties of compositions of the present invention the compositions identified in Tables I, II and III were tested for the oxidation stability and extreme pressure and anti-wear properties under the following conditions.

*Engine tests*

The engine tests were carried out in a C.R.F. gasoline engine to determine the anti-wear properties, in a Petter gasoline engine to determine the anti-sludge properties, and in a Caterpillar diesel engine to determine the detergent properties.

*C.F.R. gasoline engine*

Water-cooled single-cylinder, four-stroke engine. The test lasted 45 hours. The fuel was a gasoline having a sulfur content of 0.06% by weight and contained 0.7 ml. TEL per U.S. gallon. Cylinder cooling water temperature was 40° C.

*Petter gasoline engine*

Water-cooled single-cylinder, four-stroke engine. The test lasted 28 hours. The fuel was a motor gasoline having 1.5 ml. TEL per U.S. gallon and a sulfur content of 0.07% by weight. The cylinder cooling water temperature was about 500° C.

*Caterpillar*

Water-cooled single-cylinder, four-stroke engine. The test lasted 48 hours. The fuel was a gas oil having a sulfur content of 0.9% by weight. The cooling water temperature was about 80° C. The engine power was 18 H.P.; bore 5¾"; stroke 8"; swept volume 3.4 liters.

The products according to the invention were all tested in the form of solutions in an extracted Venezuelan paraffinic mineral lubricating oil having a viscosity of 114 cs. at 100° F., which lubricating oil in most cases also contained an ash-free lubricating oil additive having detergent properties. The additives according to the invention were added in the form of a concentrate to the mineral lubricating oil and these concentrates had been added according to the examples. The tests are assembled in the following Tables I–III. Table I shows the anti-wear properties imparted by the products according to the invention to the mineral lubricating oil. Table II shows the anti-sludge properties and Table III shows the detergent properties imparted to the lubricating oil.

TABLE I.—C.F.R. WEAR TESTS

| Additive of the invention (concentrate) | Ash-free additive* with detergent effect | Percent reduction in piston ring wear compared to undoped oil |
| --- | --- | --- |
| 1.18% by weight of additive of Example I. | 2% by weight | 65 |
| 0.86% by weight of additive of Example V. | None | 70 |
| Do | 1.7% by weight | 73 |
| None | 2% by weight | 0 |

*Copolymer of stearyl methacrylate/lauryl methacrylate/hydroxyethyl methacrylate (5:5:2).

TABLE II.—PETTER SLUDGE TESTS

| Additive of the invention (concentrate) | Ash-free additive* with detergent effect | Sludge-rating (10 is clean) |
| --- | --- | --- |
| 1.18% by weight of additive of Example I. | 2% by weight | 8.0 |
| 0.93% by weight of additive of Example III. | 1.7% by weight | 7.6 |
| 0.86% by weight of additive of Example V. | do | 7.7 |
| 0.6% by weight of additive of Example II. | 2% by weight | 7.7 |
| None | do | 6.5 |
| Do | None | 4.4 |

*See footnote, Table I.

TABLE III.—CATERPILLAR PISTON FOULING TESTS

| Additive of the invention (concentrate) | Ash-free additive* with detergent effect | Piston fouling (10 is clean) |
| --- | --- | --- |
| 0.93% by weight of additive of Example III. | 1.7% by weight | 8.8 |
| 0.86% by weight of additive of Example V. | do | 9.2 |
| None | do | 7.8 |
| Do | None | 4.5 |

*See footnote, Table I.

Additional improvements with respect to oxidation stability and scuffing inhibition can be imparted to the oil composition of this invention by incorporating small amounts (0.01%–2%, preferably 0.1%–1%) of bisphenolic antioxidants such as p,p'-methylene bisphenols such as 4,4'-methylene bis(2,6-ditert-butyl phenol) or arylamines such as phenyl-alpha-naphthylamine and mixtures thereof. Anti-scuffing agents include organic phosphites, phosphates, phosphonates and their thio-derivatives, such as $C_{3-18}$ alkyl phosphites, or phosphonates, e.g., di- and tributyl, octyl, lauryl, stearyl, cyclohexyl, benzyl, cresyl, phenyl, phosphites or phosphates, as well as their thio-derivatives, $P_2S_5$-terpent reaction products, e.g., $P_2S_5$-pine oil reaction product and alkali metal salts thereof such as a potassium salt of a $P_2S_5$-terpene reaction product, phosphonates such as dibutyl methanephosphonate dibutyl trichloromethanephosphonate, dibutyl monochloromethanephosphonate, dibutyy chlorobenzenephosphonate, and the like. The full esters of pentavalent phosphorus acids such as triphenyl, tricresyl, trilauryl and tristearyl ortho-phosphates or potassium salt of $P_2S_5$-terpene reaction product are preferred.

I claim as my invention:

1. An improved mineral lubricating oil composition comprising a major amount of mineral lubricating oil and a minor amount, sufficient to inhibit wear, of an oil-soluble reaction product obtained by reacting at between 20° C. and 130° C. a polymerized 1,2-alkylene imine having an intrinsic viscosity of from about 0.025 to about 3 in isopropanol at 25° C. with an oil-soluble polar-containing compound selected from the group consisting of $C_{14-18}$ epoxy-alkane, $C_{14-18}$ thio-epoxy alkane, esters of glycidol and alkanoic acids having from 10 to 30 carbon atoms, glycidyl ethers of an alcohol selected from the group consisting of alkyl phenol and alkanol each having from 14 to 18 carbon atoms and $C_{14-18}$ alkyl phenols, the imine being present in the amount of 1.25 to 2 gram-equivalents per gram-equivalent of the oil-soluble polar-containing compound.

2. An improved mineral lubricating oil composition comprising a major amount of mineral lubricating oil and from about 0.5% to about 5% by weight of an oil-soluble reaction product obtained by reacting at between 20° C. and 130° C. a polymerized 1,2-alkylene imine having an intrinsic viscosity of from about 0.025 to about 3 in isopropanol at 25° C. with an oil-soluble epoxy alkane having from 14 to 18 carbon atoms in the molecule the imine being present in the amount of 1.25-2 gram-equivalents per gram-equivalent of the oil-soluble polar-containing compound.

3. An improved mineral lubricating oil composition comprising a major amount of mineral lubricating oil and from about 0.5% to about 5% by weight of an oil-soluble reaction product obtained by reacting at between 20° C. and 130° C. a polymerized 1,2-alkylene imine having an intrinsic viscosity of from about 0.025 to about 3 in isopropanol at 25° C. with an oil-soluble ester of an alkanoic acid having from 10 to 30 carbon atoms in the molecule and glycidol the imine being present in the amount of 1.25-2 gram-equivalents per gram-equivalent of the oil-soluble polar-containing compound.

4. An improved mineral lubricating oil composition comprising a major amount of mineral lubricating oil and from about 0.5% to about 5% by weight of an oil-soluble reaction product obtained by reacting at between 20° C. and 130° C. a polymerized 1,2-alkylene imine having an intrinsic viscosity of from about 0.025 to about 3 in isopropanol at 25° C. with an oil-soluble glycidyl ether of $C_{14-18}$ alkyl phenol, the imine being present in the amount of 1.25-2 gram-equivalents per gram-equivalent of the glycidyl ether compound.

5. An improved mineral lubricating oil composition comprising a major amount of mineral ubricating oil and from about 0.5% to about 5% by weight of a reaction product obtained by reacting at between 20° C. and 130° C. a polymerized ethylene imine having an intrinsic viscosity of from about 0.025 to about 3 in isopropanol at 25° C. and epoxy dodecane the imine being present in the amount of 1.25-2 gram-equivalents per gram-equivalent of epoxydodecane.

6. An improved mineral lubricating oil composition comprising a major amount of mineral lubricating oil and from about 0.5% to about 5% by weight of a reaction product obtained by reacting at between 20° C. and 130° C. a polymerized ethylene imine having an intrinsic viscosity of from about 0.025 to about 3 in isopropanol at 25° C. and glycidyl ester of $C_{14}$–$C_{18}$ aliphatic carboxylic acid the imine being present in the amount of 1.25-2 gram-equivalents per gram-equivalent of $C_{14-18}$ aliphatic carboxylic acid.

7. An improved mineral lubricating oil composition comprising a major amount of mineral lubricating oil and from about 0.5% to about 5% by weight of a reaction product obtained by reacting at between 20° C. and 130° C. a polymerized ethylene imine having an intrinsic viscosity of from about 0.025 to about 3 in isopropanol at 25° C. and glycidyl decyl ether the imine being present in the amount of 1.25-2 gram-equivalents per gram-equivalent of glycidyl decylether.

8. An improved mineral lubricating oil composition comprising a major amount of mineral lubricating oil and from about 0.5% to about 5% by weight of a reaction product obtained by reacting at between 20° C. and 130° C. a polymerized ethylene imine having an intrinsic viscosity of from about 0.025 to about 3 in isopropanol at 25° C. and $C_{14-18}$ alkyl phenol the imine being present in the amount of 1.25-2 gram-equivalents per gram-equivalent of $C_{14-18}$ alkyl phenol.

References Cited by the Examiner

UNITED STATES PATENTS

| | | | |
|---|---|---|---|
| 2,272,489 | 2/42 | Ulrich | 260—2 |
| 2,457,328 | 12/48 | Swern et al. | 260—2 |
| 2,620,305 | 12/52 | Stewart et al. | 252—51.5 |
| 2,626,931 | 1/53 | Bestian | 260—2 |
| 2,819,278 | 1/58 | DeGroot et al. | 260—404.5 |
| 2,842,498 | 7/58 | Darling | 252—51.5 |
| 2,901,443 | 8/59 | Starck et al. | 260—2 |
| 3,048,544 | 8/62 | Stewart et al. | 252—51.5 |

FOREIGN PATENTS

| | | |
|---|---|---|
| 466,270 | 5/37 | Great Britain. |
| 488,553 | 7/38 | Great Britain. |
| 869,084 | 5/61 | Great Britain. |

DANIEL E. WYMAN, *Primary Examiner.*

JULIUS GREENWALD, *Examiner.*